United States Patent
Kuwano et al.

(10) Patent No.: US 11,685,196 B2
(45) Date of Patent: Jun. 27, 2023

(54) PNEUMATIC TIRE

(71) Applicant: TOYO TIRE CORPORATION, Itami (JP)

(72) Inventors: Shingo Kuwano, Itami (JP); Shuichi Nishikawa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 634 days.

(21) Appl. No.: 16/712,293

(22) Filed: Dec. 12, 2019

(65) Prior Publication Data
US 2020/0207157 A1    Jul. 2, 2020

(30) Foreign Application Priority Data

Dec. 27, 2018 (JP) .................................. 2018-245805
Dec. 27, 2018 (JP) .................................. 2018-245807
Dec. 27, 2018 (JP) .................................. 2018-245809

(51) Int. Cl.
  *B60C 11/03* (2006.01)
  *B60C 11/13* (2006.01)
  *B60C 11/12* (2006.01)

(52) U.S. Cl.
  CPC ...... *B60C 11/1376* (2013.01); *B60C 11/0304* (2013.01); *B60C 11/12* (2013.01); *B60C 11/1353* (2013.01)

(58) Field of Classification Search
  CPC . B60C 11/11; B60C 11/0304; B60C 11/0306; B60C 11/1376; B60C 2011/0348; B60C 2011/0351; B60C 2011/1231; B60C 2011/1245
  See application file for complete search history.

(56) References Cited

FOREIGN PATENT DOCUMENTS

| JP | S58-85507 U | * | 6/1983 | |
|---|---|---|---|---|
| JP | 2005-153812 A | | 6/2005 | |
| JP | 2006151225 A | * | 6/2006 | ......... B60C 11/1272 |
| JP | 2017-210168 A | | 11/2017 | |

OTHER PUBLICATIONS

JP S58-85507 Machine Translation (Year: 1983).*
JP 2006-151225 Machine Translation; Kiwaki, Koyo (Year: 2006).*
Office Action dated Sep. 7, 2021, issued in counterpart CN application No. 201911232163.1, with English machine translation. (11 pages).

* cited by examiner

*Primary Examiner* — Robert C Dye
*Assistant Examiner* — Nicholas J Weiler
(74) *Attorney, Agent, or Firm* — WHDA, LLP

(57) ABSTRACT

A pneumatic tire includes block rows which are arranged in a tire width direction and each of which includes a plurality of blocks defined by main grooves extending in a tire circumferential direction and lateral grooves extending in a tire width direction. The plurality of block rows includes inner block rows which are the block rows other than an outermost block row located most outwardly in the tire width direction. Numbers of the blocks included in the inner block rows increase toward an inner side in the tire width direction. The blocks in each of the inner block rows include an auxiliary-grooves-formed block having, on an outer surface thereof, an auxiliary groove region in which a plurality of drain auxiliary grooves extending in the tire circumferential direction are formed. Occupied areas in each of the inner block rows decrease toward the inner side in the tire width direction.

3 Claims, 3 Drawing Sheets

PNEUMATIC TIRE

CROSS-REFERENCE TO RELATED APPLICATIONS

This application claims priority of Japanese Patent Application No.: 2018-245805 filed on Dec. 27, 2018, Japanese Patent Application No.: 2018-245807 filed on Dec. 27, 2018, and Japanese Patent Application No.: 2018-245809 filed on Dec. 27, 2018, the contents of which are incorporated herein by reference.

BACKGROUND OF THE INVENTION

Technical Field

The present invention relates to a pneumatic tire.

Related Art

Conventionally, a pneumatic tire having a tread pattern having a microgroove region in which microgrooves are formed and a non-microgroove region in which no microgrooves are formed in a land portion has been known (for example, see JP 2017-210168 A).

However, the conventional pneumatic tire has only a configuration for facilitating the distinction between all-season tires and summer tires, and does not take into consideration the ground contact property during cornering. The conventional pneumatic tire does not take into consideration both initial drainage and uneven wear resistance.

SUMMARY

An object of a first aspect of the present invention is to provide a pneumatic tire capable of enhancing initial drainage performance and improving the ground contact property during cornering. An object of a second aspect of the present invention is to provide a pneumatic tire capable of improving both initial drainage and uneven wear resistance. An object of a third aspect of the present invention is to provide a pneumatic tire capable of enhancing initial drainage performance.

A first aspect of the present invention provides, as means for solving the above-described problems, a pneumatic tire including block rows which are arranged in a tire width direction and each of which includes a plurality of blocks defined by main grooves extending in a tire circumferential direction and lateral grooves extending in a tire width direction. The plurality of block rows include inner block rows which are the block rows other than an outermost block row located most widely in the tire width direction. Numbers of the blocks included in the inner block rows increase toward an inner side in the tire width direction. The blocks in each of the inner block rows include an auxiliary-grooves formed block having, on an outer surface thereof, an auxiliary groove region in which a plurality of drain auxiliary grooves extending in the tire circumferential direction and arranged in the tire width direction are formed. Occupied areas each of which is occupied by the auxiliary groove region in each of the inner block rows decrease toward the inner side in the tire width direction.

With this configuration, the initial drainage performance can be enhanced by the auxiliary-grooves formed blocks. The occupied areas of the auxiliary groove region decrease toward the inner side in the tire direction. For this reason, even if the contact pressure on the inner side in the tire width direction increases during cornering, the ground contact shape of the entire ground contact surface can be stabilized. That is, the ground contact property during cornering can be improved.

Preferably, the inner block rows include three rows, and the numbers of blocks included in the inner block rows have a ratio of 1:2:3 toward the inner side in the tire width direction.

With this configuration, the block rigidity can be suppressed toward the inner side in the tire width direction, and the ground contact property can be enhanced.

In this case, width dimensions of the lateral grooves in the inner block rows preferably decrease toward the inner block row side located on the inner side in the tire width direction.

With this configuration, it is possible to suppress the block rigidity from being excessively reduced by the numbers increasing toward the inner side in the tire width direction.

The blocks in the outermost block row preferably have the drain auxiliary grooves partially from an inner side end in the tire width direction toward an outer side in the tire width direction.

With this configuration, it is also possible to enhance drainage while maintaining the block rigidity of the outermost block row.

A second aspect of the present invention provides, as means for solving the above-described problems, a pneumatic tire including a plurality of land portions formed in a tread portion. The land portions have, on an outer surface thereof, a plurality of drain auxiliary grooves extending in a tire circumferential direction and arranged in parallel with a flat surface interposed therebetween in a tire width direction. Each of the drain auxiliary grooves has a groove bottom that becomes gradually shallower toward an outer side in the tire width direction.

With this configuration, the initial drainage performance can be exhibited. Moreover, the rigidity of the groove bottom of the drain auxiliary grooves can be increased to improve uneven wear resistance.

The land portions preferably include an auxiliary-grooves formed land portion in which a plurality of drain auxiliary grooves are formed on an outer surface thereof and a land portion without grooves in which no drain auxiliary grooves are formed.

The drain auxiliary grooves located on the outer side in the tire width direction preferably have a larger depth than that of the drain auxiliary grooves located on an inner side in the tire width direction.

With this configuration, the rigidity of the drain auxiliary grooves located on the outer side in the tire width direction can be increased as compared with that of the drain auxiliary grooves located on the inner side in the tire width direction.

An interval between the drain auxiliary grooves adjacent in the tire width direction is preferably larger on the outer side in the tire width direction than on an inner side in the tire width direction.

With this configuration, the rigidity of the drain auxiliary grooves located on the outer side in the tire width direction can be increased as compared with that of the drain auxiliary grooves located on the inner side in the tire width direction.

The drain auxiliary grooves preferably have a depth dimension of 0.1 mm or more and 0.2 mm or less from a tire reference surface.

If the depth dimension of the drain auxiliary grooves from the tire reference surface is less than 0.1 mm, the initial drainage performance cannot be sufficiently exhibited. On the other hand, if the depth dimension of the drain auxiliary grooves from the tire reference surface exceeds 0.2 mm, sufficient rigidity of the land portion cannot be achieved.

A width dimension of the flat surface formed between the drain auxiliary grooves is preferably 1 mm or less.

With this configuration, it is possible to prevent the interval between the drain auxiliary grooves from becoming too wide to sufficiently exhibit the initial drainage performance.

An interval between the drain auxiliary grooves adjacent in the tire width direction is preferably 0.4 mm or more and 3.3 mm or less.

With this configuration, the number of drain auxiliary grooves per unit area can be set to an appropriate value.

Preferably, the drain auxiliary grooves include a first inclined surface that becomes shallower toward the outer side in the tire width direction, and a second inclined surface that becomes deeper toward the outer side in the tire width direction following the first inclined surface, and $45°<\theta1<85°$ is satisfied where $\theta1$ is an angle between the first inclined surface and a tire radial direction.

With this configuration, it is possible to form a recess that deepens sharply on the inner side in the tire radial direction and to ensure drainage.

Preferably, the drain auxiliary grooves include a first inclined surface that becomes shallower toward the outer side in the tire width direction, and a second inclined surface that becomes deeper toward the outer side in the tire width direction following the first inclined surface, and $5°<\theta2<45°$ is satisfied where $\theta2$ is an angle between the second inclined surface and a tire radial direction.

With this configuration, it is possible to gradually reduce the groove depth toward the outer side in the tire radial direction and to ensure sufficient rigidity.

Preferably, the drain auxiliary grooves include a first inclined surface that becomes shallower toward the outer side in the tire width direction, and a second inclined surface that becomes deeper toward the outer side in the tire width direction following the first inclined surface, and $\theta1>\theta2$ and $\theta1+\theta2=90°$ are satisfied where $\theta1$ is an angle between the first inclined surface and a tire radial direction and $\theta2$ is an angle between the second inclined surface and the tire radial direction.

With this configuration, there is no inconvenience that an intersecting portion between the first inclined surface and the second inclined surface forms an acute angle, where cracks are likely to occur, or an obtuse angle, where drainage performance fails to be fully exhibited.

The groove bottom of the drain auxiliary grooves is preferably formed to straddle a tire reference surface in a tire radial direction.

A third aspect of the present invention provides, as means for solving the above-described problems, a pneumatic tire including a plurality of block rows in a tire width direction, each of the block rows including a plurality of blocks formed by main grooves extending in a tire circumferential direction and lateral grooves extending in the tire width direction, the blocks being arranged in the tire circumferential direction. The plurality of block rows include inner block rows which are the block rows other than an outermost block row located most outwardly in the tire width direction, include a block having, on an outer surface thereof, an auxiliary groove region including a plurality of drain auxiliary grooves extending in the tire circumferential direction. All blocks included in a central outer block row formed from a central position in the tire width direction to an outer side include, on an outer surface thereof, the auxiliary groove region and are inclined in the tire circumferential direction toward an outer side in the tire width direction.

With this configuration, since the ground contact length is increased at a tire center portion, the circumferential length of the block is increased by inclining the block. As a result, the circumferential length of the drain auxiliary grooves is also increased, and the drainage can be improved.

Each of the blocks included in the central outer block row preferably includes a first projection projecting to one side in the tire circumferential direction and a second projection projecting to another side in the tire circumferential direction toward the outer side in the tire width direction.

With this configuration, the rigidity in the front-rear direction of the block can be ensured regardless of whether the mounting position of the tire is on either side in the width direction of the vehicle or whether the tire rotates in the forward or reverse direction.

Preferably, a plurality of sets of blocks are arranged at predetermined intervals in the tire circumferential direction, each of the sets being composed of the blocks included in the inner block rows, the blocks having outer surfaces that all serve as the auxiliary groove region and arranged so as to incline in the tire circumferential direction continuously toward the outer side in the tire width direction.

With this configuration, the presence of the auxiliary groove region can prevent a decrease in the ground contact area of a new tire and ensure dry performance.

The main groove formed between the outermost block row and the central outer block row may be formed in a zigzag pattern.

Since the drain auxiliary grooves are formed in all the blocks constituting the central outer block row, desired drainage is ensured even when the main groove is a zigzag groove with lower drainage than that of a straight groove extending in the tire circumferential direction.

According to the first aspect of the present invention, it is possible to enhance initial drainage performance and improve the ground contact property during cornering. According to the second aspect of the present invention, it is possible to improve both initial drainage and uneven wear resistance. According to the third aspect of the present invention, it is possible to enhance the initial drainage performance.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Embodiments according to the present invention will be described below with reference to the accompanying drawings. The following description is essentially for illustrative purposes only and is not intended to limit the present invention and applications or use thereof.

First Embodiment

Figure 1:
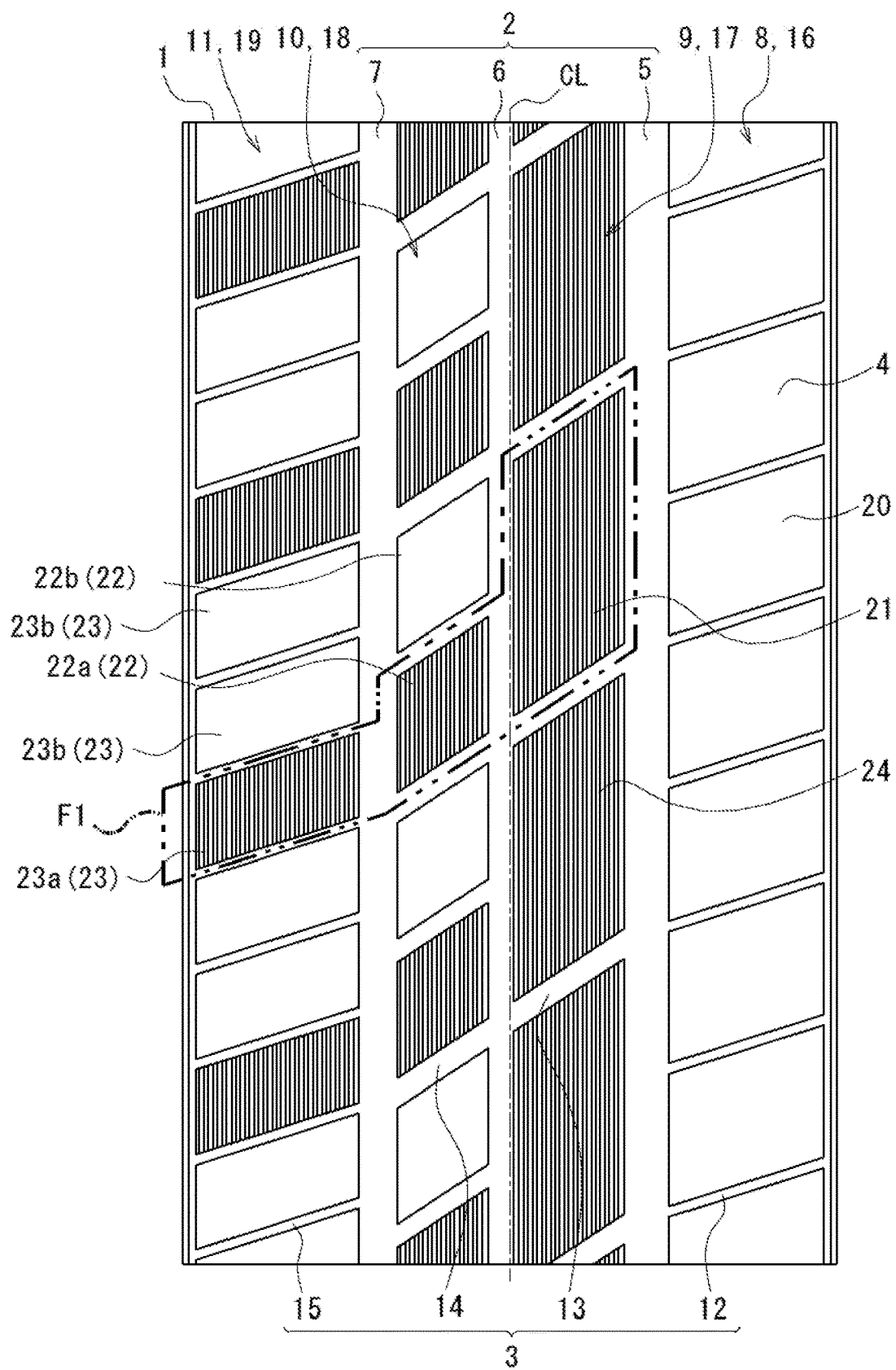
FIG. 1 is a partial development view illustrating a tread portion of a pneumatic tire according to a first embodiment.

FIG. 1 is a partial development view illustrating a tread portion 1 of a pneumatic tire according to the present embodiment. In this tread portion 1, a plurality of blocks 4 are formed by a plurality of main grooves 2 extending in the tire circumferential direction and a plurality of lateral grooves 3 extending in the tire width direction.

The main grooves 2 include three main grooves, namely, a first main groove 5, a second main groove 6, and a third main groove 7 in the order from the outer side in the tire width direction toward the inner side in the tire width direction. The groove width of the first main groove 5 is the widest, followed by the third main groove 7, and the second main groove 6 is the narrowest of these. The second main groove 6 is located on a center line CL in the tire width direction.

The outermost region in the tire width direction defined by the first main groove 5 is an outer shoulder portion 8. An area defined by the first main groove 5 and the second main groove 6 is an outer center portion 9. That is, the outer shoulder portion 8 and the outer center portion 9 are located on the outer side in the tire width direction with respect to the center line CL in the tire width direction. An area defined by the second main groove 6 and the third main groove 7 is an inner center portion 10. The innermost region in the tire width direction defined by the third main groove 7 is an inner shoulder portion 11. That is, the inner center portion 10 and the inner shoulder portion 11 are located on the inner side in the tire width direction with respect to the center line CL in the tire width direction.

The lateral grooves 3 include first lateral grooves 12 formed in the outer shoulder portion 8, second lateral grooves 13 formed in the outer center portion 9, third lateral grooves 14 formed in the inner center portion 10, and fourth lateral grooves 15 formed in the inner shoulder portion 11.

The first lateral grooves 12, the second lateral grooves 13, the third lateral grooves 14, and the fourth lateral grooves 15 are all inclined in the same tire circumferential direction (upward in the figure) toward the outer side in the tire width direction. The first lateral grooves 12 and the fourth lateral grooves 15 are formed with substantially the same width dimension and inclination angle with respect to the tire width direction. The second lateral grooves 13 and the third lateral grooves 14 have substantially the same width dimension and inclination angle with respect to the tire width direction. This inclination angle is formed to be larger than that of the first lateral grooves 12 and the fourth lateral grooves 15.

The blocks 4 are arranged in four rows in the tire width direction and aligned in the tire circumferential direction. A first block row 16, a second block row 17, a third block row 18, and a fourth block row 19 are arranged sequentially from the outer side in the tire width direction toward the inner side in the tire width direction. The first block row 16 is the outermost block row, and the second block row 17, the third block row 18, and the fourth block row 19 are inner block rows.

In the first block row 16, a plurality of outer shoulder blocks 20 each of which is a parallelogram in plan view are arranged with the first lateral grooves 12 interposed therebetween in the tire circumferential direction.

In the second block row 17, a plurality of outer center blocks 21 each of which is a parallelogram in plan view are arranged with the second lateral grooves 13 interposed therebetween in the tire circumferential direction. The number of outer center blocks 21 is half the number of outer shoulder blocks 20, and two outer shoulder blocks 20 correspond to one outer center block 21.

In the third block row 18, a plurality of inner center blocks 22 each of which is a parallelogram in plan view are arranged with the third lateral grooves 14 interposed therebetween in the tire circumferential direction. The number of inner center blocks 22 is twice the number of outer center blocks 21, and two inner center blocks 22 correspond to one outer center block 21.

In the fourth block row 19, a plurality of inner shoulder blocks 23 each of which is a parallelogram in plan view are arranged with the fourth lateral grooves 15 interposed therebetween in the tire circumferential direction. The number of inner shoulder blocks 23 is three times the number of outer center blocks 21, and three inner shoulder blocks 23 correspond to one outer center block 21.

Thus, the ratio of the numbers of the outer center blocks 21, the inner center blocks 22, and the inner shoulder blocks 23 is 1:2:3. As a result, the numbers of blocks increase toward the inner side in the tire width direction, and the size of each block 4 in the tire circumferential direction decreases toward the inner side in the tire width direction. On the other hand, the groove width of the fourth lateral grooves 15 is set smaller than the groove widths of the second lateral grooves 13 and the third lateral grooves 14. Therefore, the inner center blocks 22 are more easily deformed than the outer center blocks 21 are when traveling on the road surface, and the inner shoulder blocks 23 are more easily deformed than the inner center blocks 22 are, whereas the former has a smaller groove width than the latter. As a result, a decrease in rigidity due to a smaller block size is suppressed, and a uniform ground contact area can be obtained as a whole.

Figure 2:
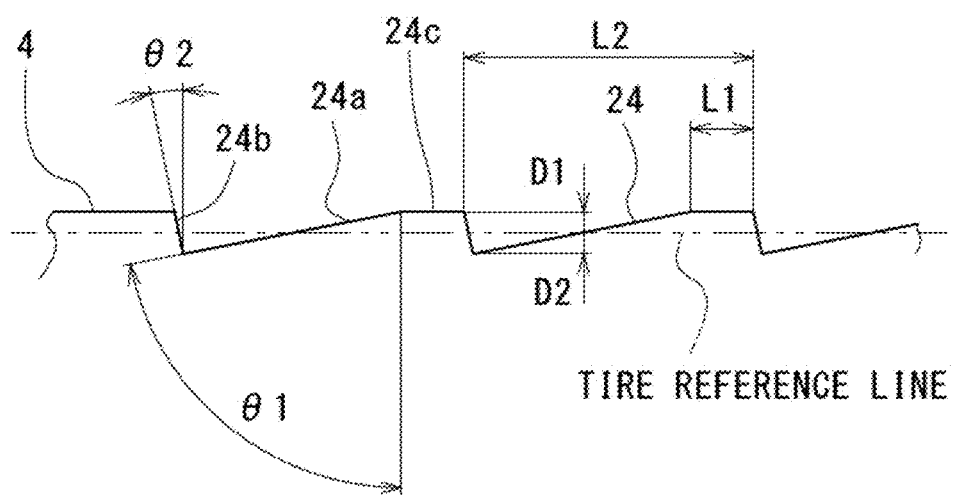
FIG. 2 is a sectional view of drain auxiliary grooves illustrated in FIG. 1.

The blocks 4 in each block row include those in which drain auxiliary grooves 24 are formed on the outer surface. The drain auxiliary grooves 24 extend along the tire circumferential direction and are arranged at regular intervals in the tire width direction. As illustrated in FIG. 2, the drain auxiliary grooves 24 each include a first inclined surface 24a and a second inclined surface 24b.

The first inclined surface 24a is inclined outward in the tire radial direction from the groove bottom toward the outer side in the tire width direction. In a meridian cross section, an angle θ1 formed by the first inclined surface 24a and the tire radial direction is sufficiently large and is set to satisfy $45°<θ1<85°$. Here, θ1 is set to 75°.

The second inclined surface 24b is inclined outwardly in the tire width direction from the outer surface toward the inner side in the tire radial direction and joins the first inclined surface 24a, thereby forming a V-shaped groove bottom. In the meridian section, an angle θ2 formed by the second inclined surface 24b and the tire radial direction is sufficiently small and is set to satisfy $5°<θ2<45°$. Here, θ2 is set to 15°.

The relation between the angle θ1 and the angle θ2 is set to satisfy $θ1+θ2=90°$.

Thus, the first inclined surface 24a is gently inclined, and the rigidity at this part is enhanced. On the other hand, the second inclined surface 24b is inclined sharply and forms a recess that exhibits a sufficient drainage function. In addition, by satisfying $θ1+θ2=90°$, the first inclined surface 24a and the second inclined surface 24b intersect, not at an acute angle or an obtuse angle, but at a right angle at the groove bottom. If the inclined surfaces intersect at an acute angle at the groove bottom, cracks are likely to occur. If the inclined surfaces intersect at an obtuse angle, the groove becomes gently deeper and desired drainage may not be obtained. However, the intersecting angle of the first inclined surface 24a and the second inclined surface 24b is not necessarily exactly 90°, and may be 90°±10°.

Furthermore, in one drain auxiliary groove 24, a first region in which the first inclined surface 24a is formed has a sufficiently larger width dimension and thus has higher rigidity than a second region in which the second inclined surface 24b is formed does. That is, the rigidity of the entire block during cornering is improved by increasing the rigidity of the outer portion of the drain auxiliary grooves 24 in the tire width direction.

A flat surface 24c is formed between the drain auxiliary grooves 24 adjacent in the tire width direction. The flat surface 24c has a width dimension L1 set to 1 mm or less. In the present embodiment, the width dimension L1 of each flat surface 24c is constant. Alternatively, the width dimension L1 may be larger on the outer side in the tire width direction than on the inner side in the tire width direction. The flat surface 24c is not necessarily required, and the drain auxiliary grooves 24 may be formed to be continuously adjacent without the flat surface 24c. The interval (one pitch) between the adjacent drain auxiliary grooves 24 has a dimension L2 set to satisfy 0.4 mm<L2<3.3 mm. Here, the dimension L2 indicates the total value of the width dimensions of each of the drain auxiliary grooves 24 and the flat surface 24c. In the present embodiment, the dimension L2 of the interval (one pitch) between the drain auxiliary grooves 24 adjacent to each other is constant. Alternatively, the dimension L2 of the outer side in the tire width direction may be larger than the dimension L2 of the inner side in the tire width direction. A projection formed by the first inclined surface 24a, the second inclined surface 24b, and the flat surface 24c has a first half located on the outer side in the tire radial direction with respect to a tire reference line (line indicating a tire reference surface) and a remaining half located on the inner side in the tire radial direction with respect to the tire reference line in the tire meridian cross-sectional view. That is, the groove bottom of the drain auxiliary grooves 24 is formed so as to straddle the tire reference surface in the tire radial direction, and a projection dimension D1 outward in the tire radial direction with respect to the tire reference line and a recess dimension D2 inward in the tire radial direction are equal (D1=D2). The projection dimension D1 and the recess dimension D2 are set to satisfy 0.1 mm<D1 and D2<0.2 mm.

One block set is composed of one outer center block 21 in the second block row 17, corresponding two inner center blocks 22 in the third block row 18, and corresponding three inner shoulder blocks 23 in the fourth block row 19. The drain auxiliary grooves 24 are formed in all of the outer center blocks 21 in the second block row 17, half of the inner center blocks 22 in the third block row 18, and one third of the inner shoulder blocks 23 in the fourth block row 19. That is, in the third block row 18, an inner center block 22a with auxiliary grooves in which the drain auxiliary grooves 24 are formed and an inner center block 22b without auxiliary grooves in which no drain auxiliary grooves 24 are formed are located alternately in the tire circumferential direction. In the fourth block row 19, an inner shoulder block 23a with auxiliary grooves in which the drain auxiliary grooves 24 are formed and two inner shoulder blocks 23b without auxiliary grooves in which no drain auxiliary grooves 24 are formed are located sequentially in the tire circumferential direction.

In one block set, the number of blocks in which the drain auxiliary grooves 24 are formed is the same in each row. However, a comparison of the occupied areas of the auxiliary groove regions in which the drain auxiliary grooves 24 are formed in each row shows that the areas in the second block row 17, the third block row 18, and the fourth block row 19 decrease in this order. That is, the size of each block 4 in plan view decreases from the second block row 17 toward the fourth block row 19, and accordingly, the occupied areas of the auxiliary-grooves formed blocks 21, 22a, and 23a also decrease in this order.

Among the blocks 23, 22, and 21 respectively constituting the inner block rows 19, 18, and 17, the auxiliary-grooves formed blocks 23a, 22a, and 21 having outer surfaces that all serve as auxiliary groove regions are continuously provided toward the outer side in the tire width direction. These auxiliary-grooves formed blocks 23a, 22a, 21 are arranged so as to incline in the tire circumferential direction. Multiple sets of these (one set being indicated by the two-dot chain line F1 in FIG. 1) are arranged at predetermined intervals in the tire circumferential direction. Between the adjacent sets in the tire circumferential direction, one block 22b without auxiliary grooves and two blocks 23b without auxiliary grooves that do not have an auxiliary groove region are arranged.

The pneumatic tire having the above-described configuration is grounded at a constant camber angle while being mounted on a wheel. That is, the contact pressure is greater on the inner side in the tire width direction than on the outer side in the tire width direction. With the pneumatic tire of the above-mentioned configuration, the following effects are acquired.

(1) The ratio of the numbers of blocks in the second block row 17, the third block row 18, and the fourth block row 19 is set to 1:2:3. With this, the block rigidity can be suppressed toward the inner side in the tire width direction, and the ground contact property can be enhanced.

(2) Regarding the widths of the lateral grooves 3, the width of the fourth lateral grooves 15 is smaller than those of the second lateral grooves 13 and the third lateral grooves 14. With this, it is possible to suppress the block rigidity from being excessively reduced by the numbers increasing toward the inner side in the tire width direction.

(3) Regarding the occupied areas of the auxiliary groove regions in which the drain auxiliary grooves 24 are formed, the areas in the second block row 17, the third block row 18, and the fourth block row 19 decrease in this order. With this, it becomes easy to make the ground contact shape uniform in the tire width direction, and the contact pressure can be made uniform. In particular, the ground contact property during cornering can be enhanced.

(4) The drain auxiliary grooves 24 are formed in the blocks 4. With this, an all-season tire can be distinguished at a glance. Moreover, initial drainage performance can be exhibited.

Second Embodiment

Figure 3:
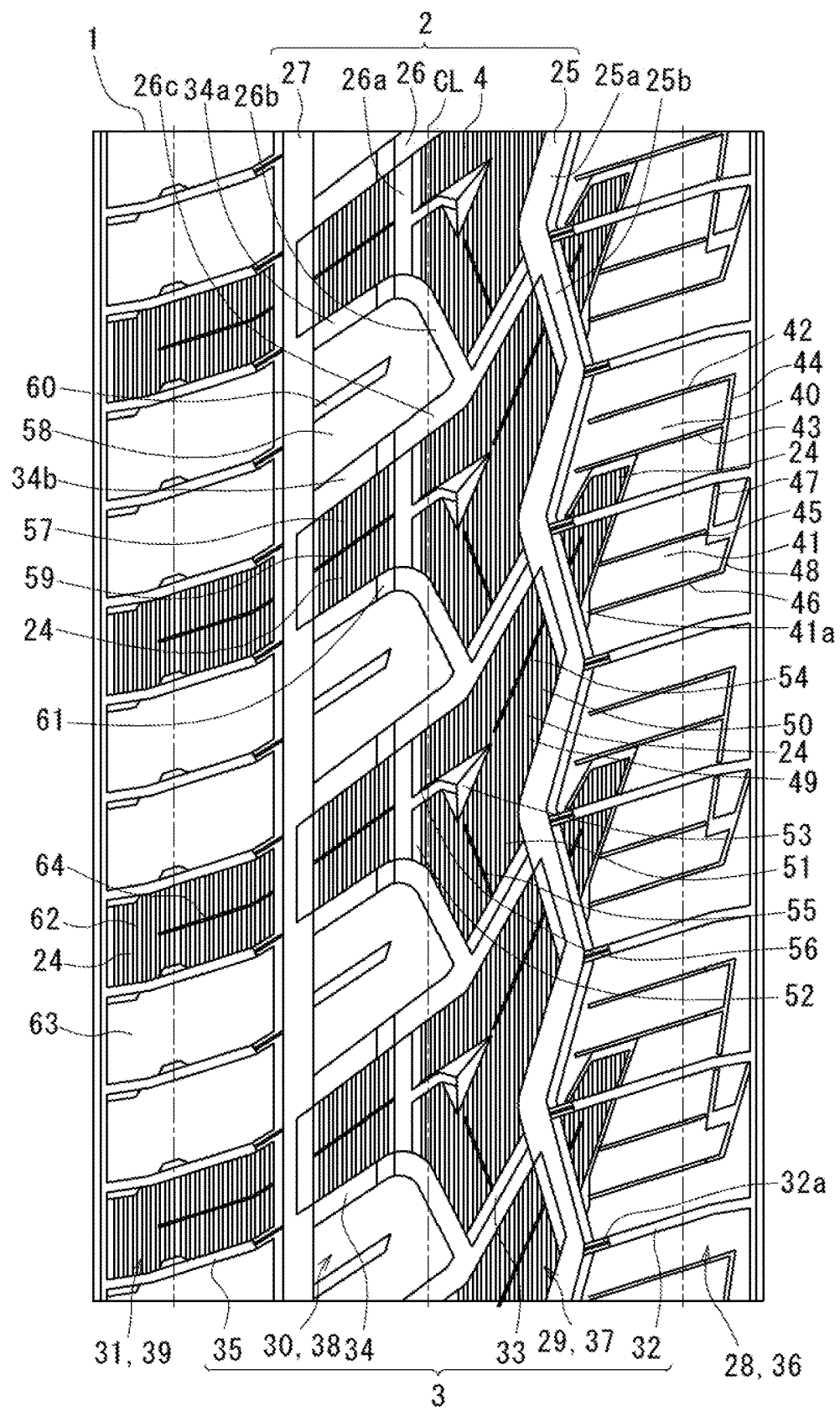
FIG. 3 is a partial development view illustrating a tread portion of a pneumatic tire according to a second embodiment.

FIG. 3 is a partial development view illustrating a tread portion 1 of a pneumatic tire according to the present embodiment. In this tread portion 1, a plurality of blocks 4 are formed by main grooves 2 extending in the tire circumferential direction and lateral grooves 3 extending in the tire width direction.

The main grooves 2 include three main grooves, namely, a first main groove 25, a second main groove 26, and a third main groove 27.

The first main groove 25 is disposed on the outer side in the tire width direction and extends in a zigzag pattern in the tire circumferential direction. That is, the first main groove 25 includes, in the tire circumferential direction (lower side in the figure), first inclined portions 25a that are inclined inward in the tire width direction and second inclined portions 25b that are inclined outward in the tire width direction.

The second main groove 26 is disposed at the center in the tire width direction and extends while meandering in the tire circumferential direction. The second main groove 26 includes first groove portions 26a, second groove portions 26b, and third groove portions 26c. The first groove portions 26a each extend in the tire circumferential direction and are located in the vicinity of the center line CL in the tire width direction. The second groove portions 26b each extend from the corresponding first groove portion 26a in the tire circumferential direction while inclining outward in the tire radial direction. The third groove portions 26c each extend from the corresponding second groove portion 26b in the tire circumferential direction while inclining inward in the tire radial direction.

The third main groove 27 is disposed on the inner side in the tire width direction and extends on the same circumference along the tire circumferential direction (in the figure, it is a straight groove extending in the vertical direction).

The outermost region in the tire width direction defined by the first main groove 25 is an outer shoulder portion 28. An area defined by the first main groove 25 and the second main groove 26 is an outer center portion 29. That is, the outer shoulder portion 28 and the outer center portion 29 are located on the outer side in the tire width direction with respect to the center line in the tire width direction. An area defined by the second main groove 26 and the third main groove 27 is an inner center portion 30. The innermost region in the tire width direction defined by the third main groove 27 is an inner shoulder portion 31. That is, the inner center portion 30 and the inner shoulder portion 31 are located on the inner side in the tire width direction with respect to the center line in the tire width direction.

The lateral grooves 3 include first lateral grooves 32 formed in the outer shoulder portion 28, second lateral grooves 33 formed in the outer center portion 29, third lateral grooves 34 formed in the inner center portion 30, and fourth lateral grooves 35 formed in the inner shoulder portion 31.

The first lateral grooves 32, the second lateral grooves 33, the third lateral grooves 34, and the fourth lateral grooves 35 have the same or substantially the same depth dimension and are inclined in the same tire circumferential direction (upward in the figure) toward the outer side in the tire width direction.

The first lateral grooves 32 and the fourth lateral grooves 35 are formed with the same or substantially the same width dimension. Compared to the first lateral grooves 32, the fourth lateral grooves 35 have a larger inclination angle with respect to a straight line extending in the tire width direction. In each of the first lateral grooves 32, a rib 32a is formed at the center of the groove bottom on the side closer to the first main groove 25.

The second lateral grooves 33 and the third lateral grooves 34 are formed with the same or substantially the same width dimension. Inclination angles, with respect to a straight line extending in the tire width direction, of the fourth lateral grooves 35, the third lateral grooves 34, and the second lateral grooves 33 increase in this order. The third lateral grooves 34 include first groove portions 34a each extending from the merged portion of the first groove portion 26a and the second groove portion 26b of the second main groove 26 to the third main groove 27, and second groove portions 34b each extending from the merged portion of the third groove portion 26c and the first groove portion 26a to the third main groove 27. The first groove portions 34a and the second groove portions 34b are alternately located in the tire circumferential direction.

The blocks 4 are arranged in four rows in the tire width direction and aligned in the tire circumferential direction. A first block row 36, a second block row 37, a third block row 38, and a fourth block row 39 are arranged sequentially from the outer side in the tire width direction toward the inner side in the tire width direction. The first block row 36 is the outermost block row, and the second block row 37, the third block row 38, and the fourth block row 39 are inner block rows.

In the first block row 36, first outer shoulder blocks 40 and second outer shoulder blocks 41 defined by the first lateral grooves 32 and the first main groove 25 are alternately arranged in the tire circumferential direction. The side surface of each of the first outer shoulder blocks 40 closer to the first main groove 25 is inclined to the center side in the tire width direction toward one side in the tire circumferential direction. The side surface of each of the second outer shoulder blocks 41 closer to the first main groove 25 is inclined outward in the tire width direction from the projecting position of the corresponding first outer shoulder block 40 toward one side in the tire circumferential direction. That is, the first outer shoulder block 40 and the second outer shoulder block 41 have a shape projecting like a mountain toward the first main groove 25. Moreover, the side surface projecting like a mountain includes an inclined surface gradually projecting in the groove toward the groove bottom.

The first outer shoulder blocks 40 each have a first narrow groove 42 and a second narrow groove 43 that extend in parallel with the first lateral grooves 32 and are located at positions dividing the first outer shoulder block 40 into three in the tire circumferential direction. One end of the first narrow groove 42 and one end of the second narrow groove 43 are located in the vicinity of the first main groove 25, but do not communicate with the first main groove 25. The other end of the first narrow groove 42 joins one end of a third narrow groove 44 formed on the outer side of a ground contact end. The third narrow groove 44 extends in the tire circumferential direction, a point along which is communicated with the other end of the second narrow groove 43. The other end of the third narrow groove 44 is located in the vicinity of the corresponding first lateral groove 32 and does not communicate with the first lateral groove 32.

The second outer shoulder blocks 41 each have a fourth narrow groove 45 and a fifth narrow groove 46 that extend in parallel with the first lateral grooves 32 and are located at positions dividing the second outer shoulder block 41 into three in the tire circumferential direction. One end of the fourth narrow groove 45 joins an auxiliary groove region in which the drain auxiliary grooves 24 described later are formed. One end of the fifth narrow groove 46 communicates with a recess 41a formed at the end of the auxiliary groove region. The other end of the fourth narrow groove 45 merges with a sixth narrow groove 47 formed on the outer side of the ground contact end. The sixth narrow groove 47 is bent and widened at a merged point with the fifth narrow groove 46, and merges with a seventh narrow groove 48 formed on the further outer side in the tire width direction than the sixth narrow groove 47. The seventh narrow groove 48 extends obliquely from a corner of the second outer shoulder block 41.

An auxiliary groove region in which the drain auxiliary grooves 24 described later are formed is provided from the second outer shoulder block 41 to the first outer shoulder block 40. The auxiliary groove region is formed in a range extending obliquely from the edge of the second outer shoulder block 41 closer to the first main groove 25 and reaching the distal end side of the second narrow groove 43 of the first outer shoulder block 40. The blocks 40 and 41 in the outermost block row 36 have the drain auxiliary grooves 24 partially from an inner side end in the tire width direction toward an outer side in the tire width direction. That is, the blocks (the first outer shoulder block 40 and the second outer shoulder block 41) of the first block row 36 which is the outermost block row have the drain auxiliary grooves 24 partially from the inner end in the tire width direction toward the outer side in the tire width direction.

In the second block row 37, outer center blocks 49 defined by the second lateral grooves 33, the first main groove 25, and the second main groove 26 are arranged in the tire circumferential direction. The outer center blocks 49 each have a first projection 50 defined by the first main groove 25 and the second main groove 26. The outer center blocks 49 each have a second projection 51 defined by a part of the second inclined portion 25*b* of the first main groove 25, the second lateral groove 33, and the third groove portion 26*c* of the second main groove 26. The outer center blocks 49 each have a third projection 52 defined by the first groove portion 26*a* and the third groove portion 26*c* of the second main groove 26 and a part of the second groove portion 26*b*. The first projection 50 and the second projection 51 extend obliquely with respect to the tire circumferential direction and function to increase the rigidity in the oblique direction. That is, during cornering, the durability increases against the oblique force acting when the outer center blocks 49 contact the ground, and the cornering performance is improved. The side surface of the distal end portion of the first projection 50 includes an inclined surface gradually projecting in the groove toward the groove bottom. With this, in the first inclined portion of the first main groove 25, both side surfaces are configured as inclined surfaces.

The outer center blocks 49 each have a recess 53 that is recessed in a triangular pyramid shape. An eighth narrow groove 54, a ninth narrow groove 55, and a tenth narrow groove 56 extends radially from the apex of the recess 53, or in the vicinity thereof, on the outer surface of the outer center block 49. One of the apexes of the recess 53 faces the first projection 50, and one end of the eighth narrow groove 54 is located in the vicinity thereof. The eighth narrow groove 54 extends so as to bisect the first projection 50 substantially equally, and has the other end communicating with the first inclined portion 25*a* of the first main groove 25. Another of the apexes of the recess 53 faces the second projection 51, and one end of the ninth narrow groove 55 is located in the vicinity thereof. The ninth narrow groove 55 extends to a position that bisects the second projection 51 substantially equally, and has the other end communicating with the second lateral grooves 33. The eighth narrow groove 54 and the ninth narrow groove 55 have substantially the same width dimension and depth dimension. The remaining one of the apexes of the recess 53 faces the third projection 52, and one end of the tenth narrow groove 56 communicates therewith. The other end of the tenth narrow groove 56 communicates with the first groove portion 26*a* of the second main groove 26. The tenth narrow groove 56 is wider than the eighth narrow groove 54 and the ninth narrow groove 55 and has a larger depth dimension than those of the eighth narrow groove 54 and the ninth narrow groove 55. The depth dimension of the tenth narrow groove 56 matches the deepest position of the recess 53. By not allowing the eighth narrow groove 54 and the ninth narrow groove 55 to communicate with the recess 53, a decrease in the rigidity of the outer center block 49 on the outer side in the tire width direction due to the forming of the eighth narrow groove 54 and the ninth narrow groove 55 can be suppressed. Furthermore, the drainage from the recess 53 can be enhanced by making the tenth narrow groove 56 wide and deep.

In the third block row 38, first inner center blocks 57 and second inner center blocks 58 defined by the third lateral grooves 34, the second main groove 26, and the third main groove 27 are alternately arranged in the tire circumferential direction. As will be described later, a plurality of drain auxiliary grooves 24 are formed on the outer surface of the first inner center blocks 57. Furthermore, the first inner center blocks 57 each include an eleventh narrow groove 59 so as to bisect the first inner center block 57 in the tire circumferential direction. One end of the eleventh narrow groove 59 communicates with the first groove portion 26*a* of the second main groove 26, and the other end communicates with the third main groove 27. Moreover, in the first inner center block 57, the side surface closer to the third main groove 27 includes an inclined surface gradually projecting in the groove toward the groove bottom. On the other hand, the second inner center blocks 58 each include a twelfth narrow groove 60 that bisects the second inner center block 58 in the tire circumferential direction from the central portion toward the third main groove 27. The twelfth narrow groove 60 has a larger width dimension than that of the eleventh narrow groove 59. The first inner center block 57 and the second inner center block 58 are connected by a rib 61 provided at the groove bottom portion of the third lateral groove 34. With this, the overall rigidity of the third block row 38 arranged at the center portion in the tire width direction is enhanced.

In the fourth block row 39, one first inner shoulder block 62 and a set of two second inner shoulder blocks 63 partitioned by the fourth lateral grooves 35 and the third main groove 27 are alternately arranged in the tire circumferential direction. As will be described later, a plurality of drain auxiliary grooves 24 are formed on the outer surface of the first inner shoulder blocks 62. Furthermore, the first inner shoulder blocks 62 each include a thirteenth narrow groove 64 extending inward in the tire width direction from the third main groove 27 and terminating in the middle in the inner shoulder block 62.

As described above, the blocks 4 in each block row include the auxiliary-grooves formed blocks 4 in which the drain auxiliary grooves 24 are formed on the outer surface. Since the configuration of the drain auxiliary grooves 24 is the same as that in the first embodiment, the same reference numeral is given, and description thereof is omitted. The drain auxiliary grooves 24 are arranged at regular intervals in the tire width direction along the tire circumferential direction on the outer surface of the auxiliary-grooves formed blocks 4.

In the first block row 36, a part of the first outer shoulder blocks 40 and the outer center blocks 49 corresponds to the auxiliary-grooves formed blocks 4, and this part serves as an auxiliary groove region in which the drain auxiliary grooves 24 are formed. In the second block row 37, all of the outer center blocks 49 correspond to the auxiliary-grooves formed blocks 4. In the third block row 38, every other one of the inner center blocks 22 arranged in the tire circumferential direction corresponds to the auxiliary-grooves formed blocks 4. In the fourth block row 39, one that comes after every two inner shoulder blocks 23 arranged in the tire circumferential direction corresponds to the auxiliary-grooves formed blocks 4. Lines of the auxiliary-grooves formed blocks 4 extend from the first block row 36 to the second block row 37, the third block row 38, and further to the fourth block row 39, in one direction in the tire circumferential direction toward the inner side in the tire width direction and in an obliquely continuous manner (corresponding to the portion indicated by the two-dot chain line F1 in FIG. 1). Furthermore, these lines are arranged in the tire circumferential direction, and are connected by the auxiliary groove regions of the second projections 51 of the outer center blocks 49.

Thus, with the pneumatic tire according to the second embodiment, in addition to the effects described in the first embodiment, the following effects can be obtained.

(1) The outer center blocks 49 each have the first projection 50 and the second projection 51 that extend obliquely toward the outer side in the tire width direction. With this, a sufficient structure can be ensured against a force acting in an oblique direction during cornering or the like.

(2) The auxiliary-grooves formed blocks 4 in which the drain auxiliary grooves 24 are formed are disposed obliquely from the first block row 36 toward the fourth block row 39. With this, it is possible to suppress a sharp change in the contact pressure between the blocks in which the drain auxiliary grooves 24 are formed and the blocks in which no drain auxiliary grooves 24 are formed.

(3) The side surfaces constituting the grooves are partially reinforced by making them inclined surfaces.

The present invention is not limited to the structures described in the above-described embodiments, and various changes can be made.

In the embodiments, the cases where the blocks 4 are formed in four rows have been described, but five or more rows may be provided. The ratio of the numbers of blocks is set to 1:2:3, except for the first block row 16 located on the outermost side in the tire width direction, but the ratio is not limited thereto as long as the numbers of blocks increase toward the inner side in the tire width direction, and the shape of each block 4 can also be set freely.

What is claimed is:

1. A pneumatic tire comprising block rows which are arranged in a tire width direction and each of which includes a plurality of blocks defined by main grooves extending in a tire circumferential direction and lateral grooves extending in a tire width direction, wherein the plurality of block rows include inner block rows which are the block rows other than an outermost block row located, when the pneumatic tire is mounted on a wheel, most outwardly in the tire width direction, numbers of the blocks included in the inner block rows increase, when the pneumatic tire is mounted on the wheel, toward an inner side in the tire width direction, the blocks in each of the inner block rows include an auxiliary-grooves formed block having, on an outer surface thereof, an auxiliary groove region in which a plurality of drain auxiliary grooves extending in the tire circumferential direction and arranged in the tire width direction are formed, occupied areas each of which is occupied by the auxiliary groove region in each of the inner block rows decrease toward the inner side in the tire width direction, the numbers of blocks included in the inner block rows becomes larger toward the inner side in the tire width direction, the inner block rows include three rows, and the numbers of blocks included in the inner block rows have a ratio of 1:2:3 toward the inner side in the tire width direction.

2. The pneumatic tire according to claim 1, wherein width dimensions of the lateral grooves in the inner block rows decrease toward the inner block row side located on the inner side in the tire width direction.

3. A pneumatic tire comprising block rows which are arranged in a tire width direction and each of which includes a plurality of blocks defined by main grooves extending in a tire circumferential direction and lateral grooves extending in a tire width direction, wherein the plurality of block rows include inner block rows which are the block rows other than an outermost block row located, when the pneumatic tire is mounted on a wheel, most outwardly in the tire width direction, numbers of the blocks included in the inner block rows increase, when the pneumatic tire is mounted on the wheel, toward an inner side in the tire width direction, the blocks in each of the inner block rows include an auxiliary-grooves formed block having, on an outer surface thereof, an auxiliary groove region in which a plurality of drain auxiliary grooves extending in the tire circumferential direction and arranged in the tire width direction are formed, occupied areas each of which is occupied by the auxiliary groove region in each of the inner block rows decrease toward the inner side in the tire width direction, the numbers of blocks included in the inner block rows becomes larger toward the inner side in the tire width direction, and the blocks in the outermost block row have the drain auxiliary grooves partially from an inner side end in the tire width direction toward an outer side in the tire width direction.

* * * * *